April 29, 1924.

J. BRACKETT

EXCAVATING MACHINE

Filed Feb. 11, 1920

Inventor
John Brackett.
By Rudolph [illegible]
Attorney.

Inventor
John Brackett.

April 29, 1924.

J. BRACKETT

1,492,419

EXCAVATING MACHINE

Filed Feb. 11, 1920    6 Sheets-Sheet 6

Inventor
John Brackett.
By
Attorney.

Patented Apr. 29, 1924.

1,492,419

UNITED STATES PATENT OFFICE.

JOHN BRACKETT, OF MILWAUKEE, WISCONSIN, ASSIGNOR TO T. L. SMITH COMPANY, OF MILWAUKEE, WISCONSIN, A CORPORATION OF WISCONSIN.

EXCAVATING MACHINE.

Application filed February 11, 1920. Serial No. 357,889.

*To all whom it may concern:*

Be it known that I, JOHN BRACKETT, a citizen of the United States, residing at Milwaukee, in the county of Milwaukee and State of Wisconsin, have invented certain new and useful Improvements in Excavating Machines; and I do hereby declare that the following is a full, clear, and exact description of the invention, such as will enable others skilled in the art to which it appertains to make and use the same.

This invention has for its object to provide certain new and useful improvements in excavating machines particularly adapted for making excavations for the foundations of buildings in ordinary earth, and also for trenching and the like.

The invention has for its particular objects to provide a machine of this character which is easily portable, but which may be readily stationed and suitably anchored by any ordinary means at any desired point contiguous to the excavation to be made, and which is further constructed and adapted to operate an ordinary scoop shovel of the kind very commonly employed for excavating purposes in connection with teams for moving said scoop from any point in the area of the excavation onto the machine and dumping the contents thereof directly into a wagon from a predetermined elevation, and then to reverse the travel of the scoop or shovel back to any desired point in the area of the excavation.

A further object of the invention is to provide manually controlled power actuated means for actuating the shovel and enabling the same to be readily controlled and operated to properly perform its several functions, this object including means for maintaining the number of operating parts of the machine at a minimum and rendering the control thereof very simple and safe.

To this end one object of the invention is to provide automatic means for disengaging a certain clutch at a predetermined point in the travel of the shovel and to automatically effect latching and release of a certain element of the machine so that it may properly perform its intended function.

A further object of the invention is to provide means for readily varying the path of travel of the scoop or shovel without requiring any readjustment of the position of the machine with respect to the area of the excavation.

A further object of the invention is to provide in conjunction with the scoop actuating mechanism above referred to, means for so guiding the draft cables as to permit the path of travel of the scoop or shovel to be angular with respect to the longitudinal axis of the machine or the plane of travel of the actuating cables with respect to the longitudinal axis of the machine or the plane of travel of the actuating cables with respect to the body of the machine.

Other objects of the invention will be readily comprehended from the following specification.

A suitable embodiment of the invention is illustrated in the accompanying drawings in which:

Figure —1— is a top plan view of an excavating machine constructed in accordance with the invention.

Figure —2— is a side elevation of the same.

Figure —3— is a fragmentary side elevation of the machine showing the load discharging means disposed in discharging position, and partly broken away to show certain details of construction.

Figure —4— is a top plan view of the interior of the housing of the machine showing the details of construction of the mechanism for actuating the scoop or shovel and other parts of the machine.

Figure —5— is a side elevation of said mechanism.

Figure —6— is a vertical transverse section on the line 6—6 of Figure —4—.

Figure —7— is a vertical transverse section on the line 7—7 of Figure —5—.

Figure —8— is a plan view showing the position of the machine and of an anchor chain associated therewith to which the pulleys over which the scoop actuating cable is adapted to be trained are adapted to be secured.

Figure —9— is a view in side elevation of a fair lead employed in the machine.

Figure —10— is a top plan view of the same.

Figure —11— is a section of the same on the line 11—11 of Figure —10—.

Figure —12— is a fragmentary detail view in elevation of a part of the receiving end portion of the machine, showing the means for effecting release of the boom adapted to effect elevation of the scoop, and its contents to discharge position.

Figure —13— is a fragmentary detail side elevation of the part of the mechanism shown in Figure —12—.

Figures —14—, —15— and —16— are respectively fragmentary detail perspective views of a hand lever and a pair of levers to be actuated thereby, each independently of the other to effect certain operations of the machine, as will appear from the following specification.

Referring now to the drawings, it will be seen that the machine comprises a suitable platform which, in the instance illustrated, is carried by side rails 1 and 2, preferably composed of structural steel elements such as channel bars. These are suitably connected together by cross braces and equipped with as much flooring as is necessary to constitute the carriage for the operating mechanism. The platform is preferably mounted on suitable axles and wheels, as shown, for rendering the same readily portable.

Mounted on said carriage is a suitable housing having side and end walls and an inclined top wall. The said walls, and particularly the side and top walls, are suitably secured to the skeleton parts of the steel frame extending similarly to a bowsprit at an elevation and an incline from the top and one end of the machine; this frame being rigidly associated with the carriage so as to provide the requisite strength to permit the functioning of the machine without damage. Within the housing thus formed there is provided a suitable motor such, for example, as an internal combustion motor 3, which is suitably geared to hoisting drums 4 and 5 respectively, one of which is mounted within and the other of which is disposed externally of the housing and over a suitable platform disposed at one side of the same and carried by the frame members 6 and 2 to receive the operator.

The drum 4 is adapted to be rotated at two different speeds for effecting the loading of the scoop at low speed, and a travel of the loaded scoop at higher speed from the loading point to the machine, while the drum 5 is adapted to effect a return of the scoop to the loading point or contiguous thereto. The details of construction of this mechanism and the means for controlling the same will be hereinafter described in detail.

The cable 33 connected with the scoop or shovel is connected at one end with the drum 4 and is trained over a sheave 8 rotatably mounted at the extreme upper ends of the parallel side frame members 9 which are extended to project rearwardly of the carriage a sufficient distance to readily permit of a wagon 10 to be properly positioned to receive the contents of the scoop as the latter is discharged. Such discharge will be effected through the discharge spout 11 secured at its ends to said side frame members 9, and which includes an upwardly and rearwardly extending apron 12 for preventing any part of the contents of the shovel or scoop being discharged upon the inclined upper wall of the housing.

The cable 33 after being trained over the sheave 8 is trained through a fair lead 13, hereinafter described, which will accommodate itself in position to variations in direction of the angle of tension on the cable between the sheave 8 and said fair lead 13, and with respect to the point in the area of excavation from which the scoop or shovel is drawn toward the machine. The said fair lead is mounted on trunnions 14 journalled in bearings in the outer ends of two perpendicular arms or projections 15 disposed at the outer or free ends of two booms 16 which are pivotally secured at their other ends to the rear end portions of the side rails of the carriage, as shown at 17. There is also rigidly secured to projections 18 associated with the projections or arms 15 and to the opposed faces of the booms 16 the side flanges 19 of a plate which is adapted to be disposed at two relatively opposite inclinations for receiving the scoop or shovel 20 connected with the cable for discharging the contents of said scoop or shovel. The aforesaid cable 33 is connected with the bail 21 of the scoop midway between its side portions, and said bail is provided with a middle portion extending almost perpendicularly to its parallel side arms so as to permit said middle portion to perform a function hereinafter particularly described. Pivotally secured to the forward edge of the carriage is a suitable plate or apron 22 which is adapted to be turned so that its free end rests upon the ground and to provide an inclined plane upon which the scoop or shovel first rides before entering the discharge scoop 19, which is normally disposed so that its forward edge rests upon the side rails of the apron 22 rearwardly of the cross plate 23 thereof which constitutes the aforesaid inclined plane, thereby presenting no shoulder against which the end of the scoop or shovel 20 may abut in travel.

Figure 3:
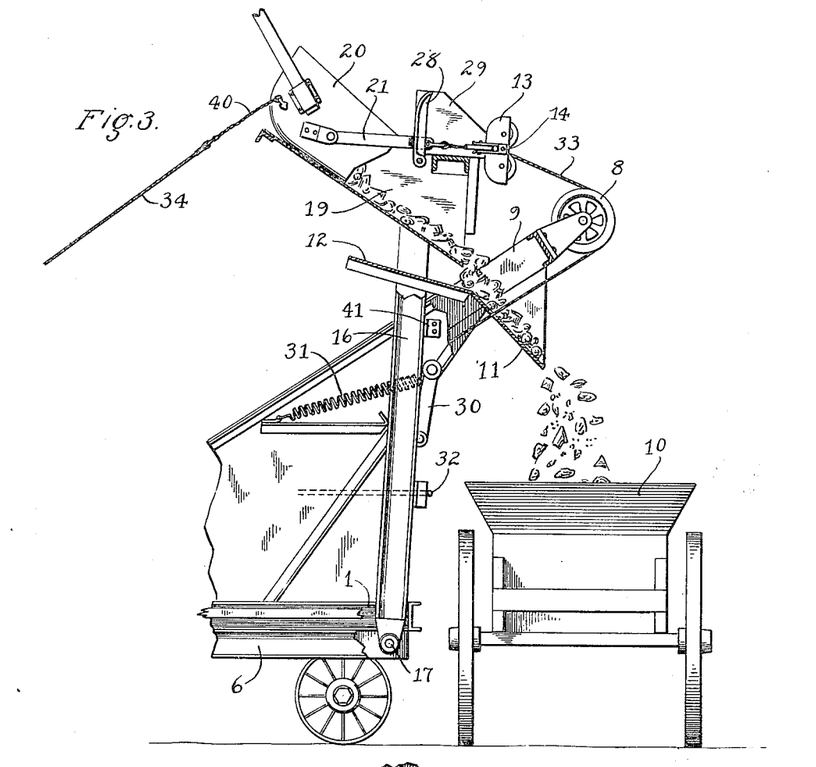

Extending upwardly from the forward end portions of the side rails of the carriage are standards 24 upon the upper ends of which the booms 16 are adapted normally to rest. To prevent said booms from being accidentally raised from this normal position, which is necessary to maintain the discharge spout or scoop 19 properly positioned with respect to the inclined plate 23, and thereby further to prevent damage to the machine, the said booms are normally latched against such upward movement by means of the latch members comprising the rock shaft 25 journalled in bearings in the outer ends of the said booms 16 and carrying at each end a latch hook 26 adapted to engage a rigid latch member 27 mounted on the standard 24. Said rock shaft is further provided with an arm 28 projecting into the path of travel of the bail 21 of the scoop or shovel so that as the latter is drawn up upon the inclined plate 23 and into the discharge element 19 it will strike said arm 28 for releasing the latch hooks 26. Securely mounted on the outer ends of the booms are suitable members or projections 29 against which the said bail 21 is adapted to abut after it has turned the arms 28 to release the latch members 26 and thereupon a further movement of the cable, which will be continued unless the controlling clutch is thrown out, will cause both the booms 16, together with the discharge element 19 and the scoop 20, to be moved to the discharge position illustrated in Figure —3—, thus effecting discharge of the contents of the scoop or shovel.

Figure 1:
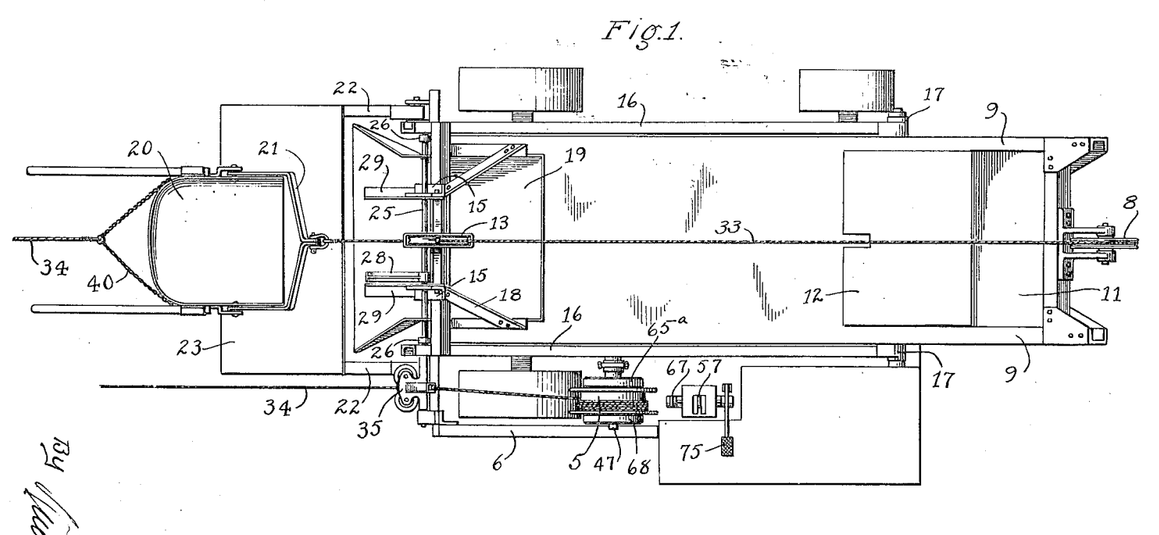
Figures 2, 12, 13:
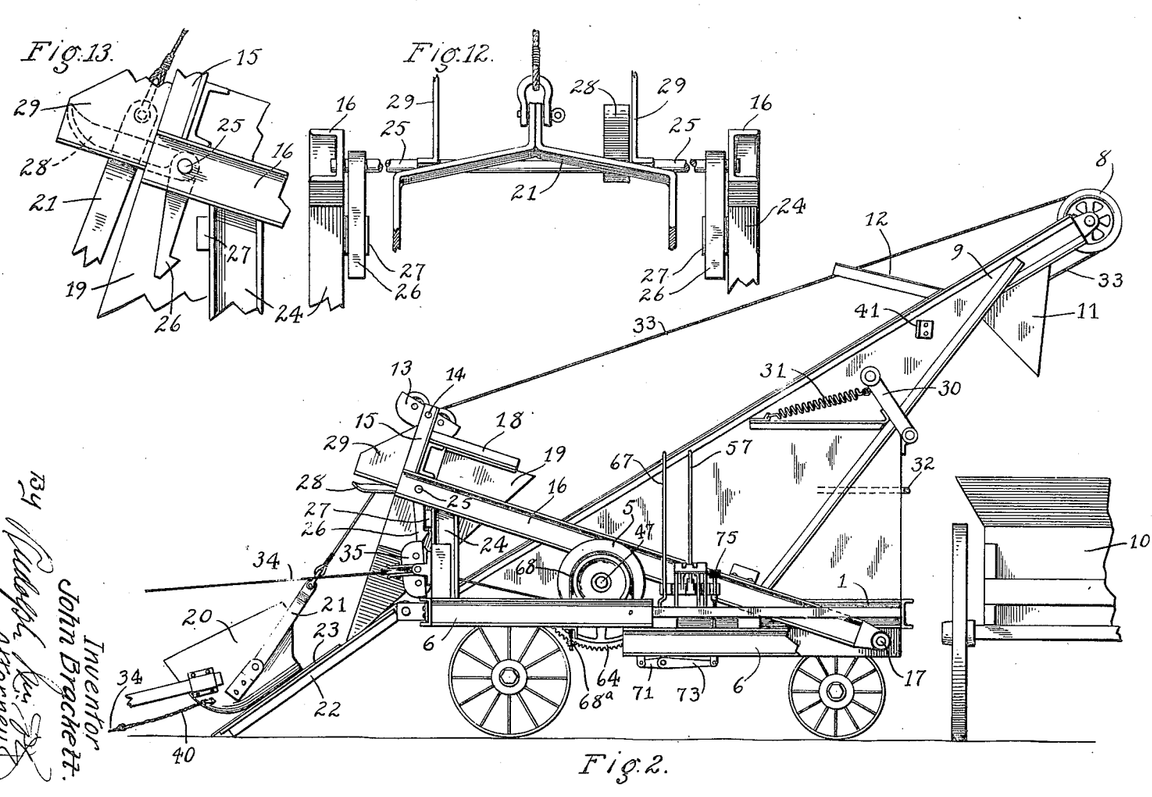

As the booms approach the discharge position shown in Figure —3—, they will strike the cushioning or retarding elements 30, each consisting of a rocking arm held normally in the position shown in Figure —2— by means of suitable tension springs 31 whereby the jar incident to sudden stoppage of the movement of said booms is considerably softened, said buffer or cushioning elements being also adapted to effect initial reverse movement of the boom 16. As said booms approach the last-named position they also engage and actuate a clutch throw-out member 32 associated with the particular clutch which is employed to effect actuation of the drum 4 at the higher speed for effecting rapid travel of the boomer bucket from the point at which it has been loaded to its discharge position, and thus the strain on the cable is immediately relieved and the possibility of a breaking jerk thereon eliminated.

The construction of the operating and control mechanism is such that if, for example, the ground being excavated contains a very sticky earth or clay which has a tendency to adhere to the scoop or shovel the operator may, after the throw-out of the aforesaid clutch, throw in the low speed clutch for controlling the drum 4 immediately after the boom has swung back from discharge position against the stops 41 under the influence of the springs 31, and cause it to again move to discharge position with a sudden jar tending to effect forcible projection of the contents of the scoop or shovel. As the low speed clutch is in no way associated with the automatic throw-out 32 it will be obvious that the control of the discharge reciprocation of the discharging means last above described, lies entirely within the control of the operator and will be dependent more or less upon whatever skill he possesses to prevent breakage of the cable. Stop projections 41 are provided against which the booms abut to limit the swinging movement in the discharge direction. This, however, is further controlled by the use of friction clutches which will permit slippage of the actuating gearing for the drum 4 without affecting breakage of the cable.

After the contents of the scoop or shovel have been thus discharged the operator will permit the boom 16 to swing back to the position shown in Figure —2— and to prevent too rapid movement and the jar incident thereto, the drum 4 is equipped with a suitable pedal brake for retarding and easing this return swing movement of the booms and shovel, this brake being hereinafter more fully described.

Figure 8:
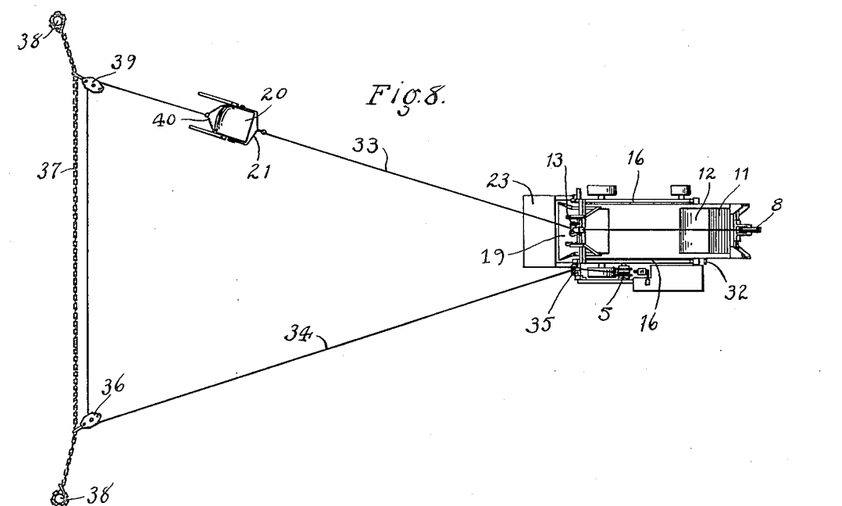
Figures 9, 11:
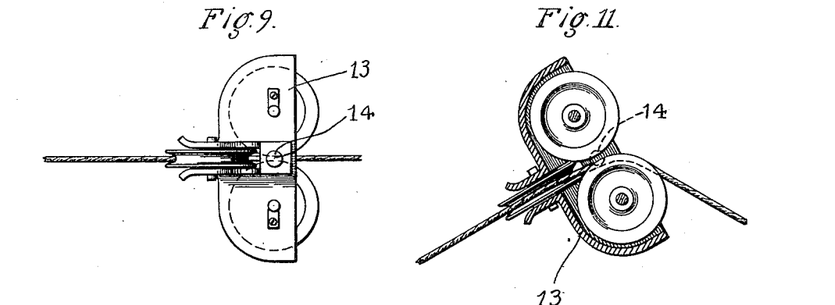
Figure 10:
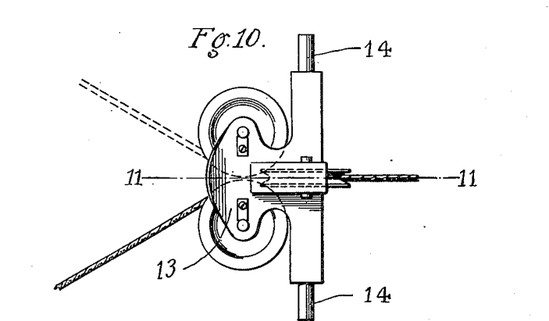
Figure 14:
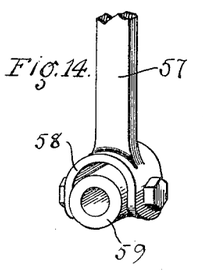
Figure 15:
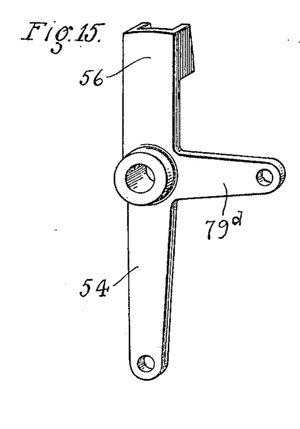
Figure 16:
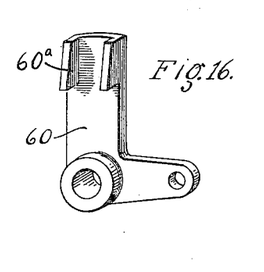

After the said booms have been returned to the position shown in Figure —2— the operator will throw in a clutch for effecting actuation of what I would term the retrieving drum 5 whereupon the scoop or shovel will be returned to whatever point in the area of the excavation is next selected for loading thereof. As shown in Figure —8— the retrieving cable 34 is trained from the fair lead 35 over a pulley 36 attached at any desired point between the ends of a tautly stretched anchor chain 37 secured at its ends to suitable posts 38 driven into the ground, and is further trained over a second pulley 39 attached to another point in the chain, and is then attached to a yoke 40 at the rear of the scoop or shovel 20.

Referring now to Figures —4— to —7— inclusive, it will be noted that within the housing there is mounted the internal combustion motor 3 which is suitably geared to a countershaft 42 by means, for example, of the sprocket chain 43 and suitable sprockets. The said shaft 42 is equipped with two spur pinions 44 and 45 of respectively different pitch diameters. Both these pinions are rigid with said shaft and the pinion 44 meshes with a spur gear 46 which is keyed to the shaft 47 on which the drum 4 is rotatably mounted so that said gear 46 will maintain said shaft 47 continuously in rotation in one direction regardless of whether the drum 4 is rotated or not. Slideable on the hub of the gear 46 is the hub 48 of the clutch operating element 49 which is engaged in a well-known manner with a band brake 50 by means of the toggle lever connection of well-known form for causing said band to so firmly engage the annular surface or flange of the drum 4 which it encircles as to cause said drum to be rotated in unison with said spur gear 46 when said clutch is thrown in. The clutch 48, 49 and 50 is engaged with the bifurcated end of a lever 51 mounted at one end of a rock shaft 52 which is provided at its other end with an arm 51ᵃ connected by means of the link 53 with the lower end of a similar lever 54 pivoted between its ends on a stud 55 and terminating at its upper end in an arcuate socket 56 in which a hand lever 57 is adapted to engage. The said hand lever has a bifurcated lower end 58 which is pivotally secured at the ends of its arms between the ends of a sleeve 59 rotatable on the shaft 55 and which is adapted to be turned to engage in the arcuate socket 56 for throwing the aforesaid clutch for causing the drum 4 to rotate at its higher speed, or as an alternative to be thrown into the similar arcuate socket 60ᵃ of a bell crank lever 60 which is connected at the end of one arm by means of a link 60ᵇ, a bell crank lever 60ᶜ and a link 60ᵈ with a lever 61 acting similarly to the lever 51 engage with the hub 62 of a second clutch member which is adapted to actuate a second band brake clutch 63 engaging another annular rim at the other end of the drum 4 for engaging said drum with the spur gear 64, which is of larger diameter than the spur gear 46 and meshes with the smaller spur pinion 45 on the shaft 42. The said spur gear 64 is also provided with a hub similar to that of the spur gear 46, but which is rotatable on the shaft 47, and which normally rotates freely, but at lower speed than the spur gear 46. From the foregoing description it will be obvious that either of the two clutches described may be thrown in for actuating the drum 4 in either of two speeds, but that the arrangement of the hand lever 57 will not permit both said clutches to be thrown in simultaneously.

Figure 5:
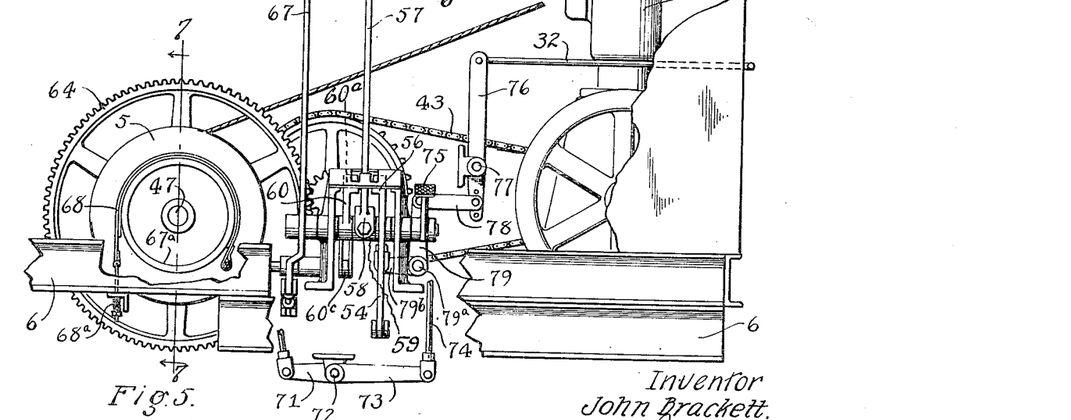
Figure 6:
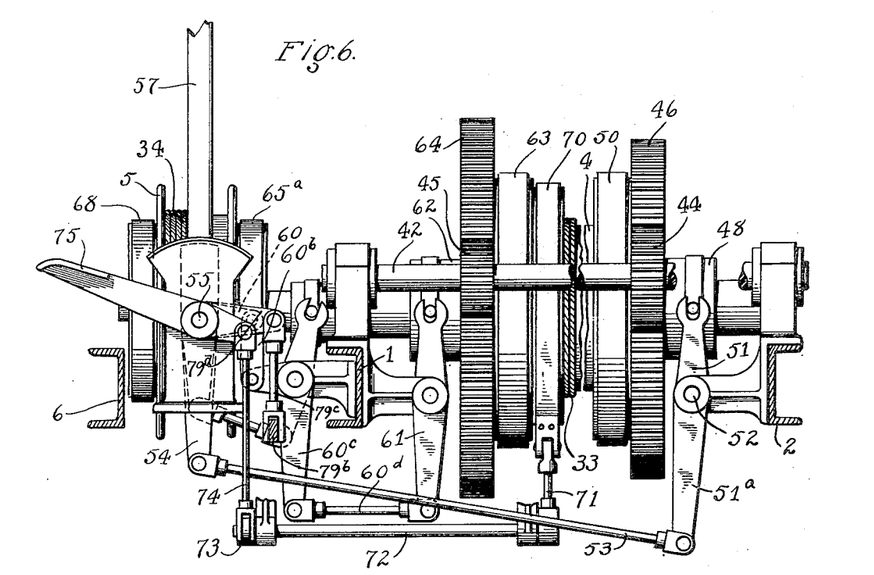
Figure 7:
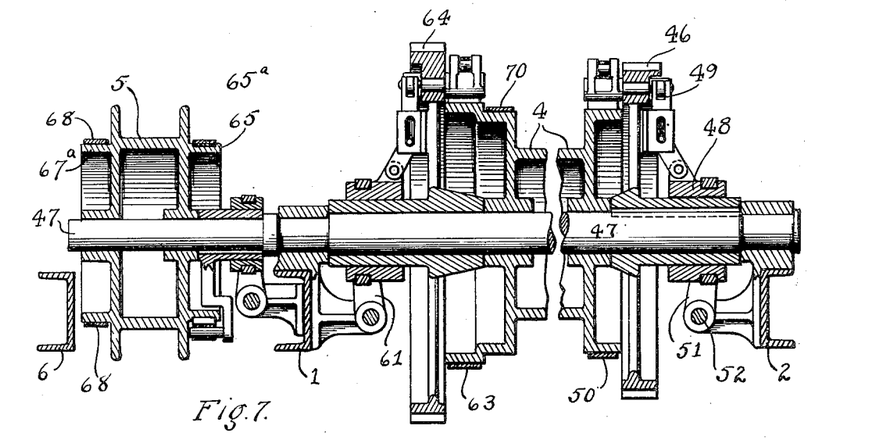

The said shaft 47 also carries a second rotatable drum 5 on which the retrieving cable for drawing back the scoop or shovel after the discharge of its load is wound. This drum is also provided at one end with an annular flange 65 receiving a band brake clutch 65ᵃ which is contracted to clutch the rim, by well known mechanism actuated by the hand lever 67. This hand lever 67 extends parallel with and adjacent to the lever 57. At the other end of the drum 5 there is a second annular rim 67ᵃ adapted to be engaged by a band brake 68, the sole purpose of which is to retard the free rotation of the drum 5 during the period that the cable is being unwound therefrom as the scoop or shovel is being drawn toward its discharge position. This band brake is actuated by a spring 68ᵃ, shown in Figure —5—, so as to maintain it under a constant tension. It does not, however, act to seriously retard the winding up movement of the drum 5 as the tension exerted by said spring is relatively light so that very little loss of power ensues by reason of the use of the said brake.

It will be noted that when the scoop elevating booms are at the upper limit of their movement and in contact with the stops on the frame they will be substantially vertically disposed and slightly beyond the vertical plane of their pivots in the direction of the rear end of the machine, and that as soon as said booms are thrown rearwardly beyond said vertical plane by the action of the buffer springs they will return by gravity to their normal or lower positions. As the scoop and other parts carried at the outer end of said booms are relatively heavy, and they are themselves relatively very heavy, it would be dangerous to let them drop by gravity to their lower positions and in order that this return gravity movement may be retarded the drum 4 is also equipped with a band brake 70, one end of which is connected with an arm 71 at one end of a rock shaft 72 suitably journalled in bearings on the machine, and which at its other end is equipped with an arm 73 connected by means of the link 74 with the inner end of a foot lever 75 pivoted on the shaft 55 at one end of the latter. Thus the operator not only controls the hand levers before mentioned, but also controls the said brake at the same time that he is operating either or both said levers, and is thus enabled to retard the return movement of the booms as desired.

The purpose of the two speeds of the drum 4 is that primarily as the scoop is being loaded by being projected into the earth and the strain on the power plant will be greatest and, therefore, the speed should be considerably reduced in order to economize on the size of motor required. After the scoop has been loaded, however, the power required to haul it to its discharge point is relatively small, and it is desirable for the purpose of economizing time that its travel should then be as rapid as is consistent with its function and safe operation. Accordingly, during the digging stroke of the boom or shovel the clutch controlling the actuation of the drum by means of the spur gear 64 will be thrown in and as soon as the scoop has received its load this clutch will be thrown out, and the clutch controlling the spur gear 46 will be thrown in; thus causing the scoop or shovel to be drawn fairly rapidly to the machine, and to be elevated to discharge position. After this operation has been performed the booms are permitted to return to their normal position under the retarding influence of the brake 70, and as soon as this has been accomplished, the clutch controlling the retrieving drum 33 will be thrown in, and thereupon said scoop will be drawn back to whatever point may be desired for again effecting loading thereof. It is also desirable that during the retrieving movement of the scoop or shovel, the cable for drawing it toward the machine should be maintained taut, and for this reason the operator will, during this period, maintain a light pressure on the brake 70 to prevent the unwinding of an undue length of cable from the drum 4.

Figure 4:
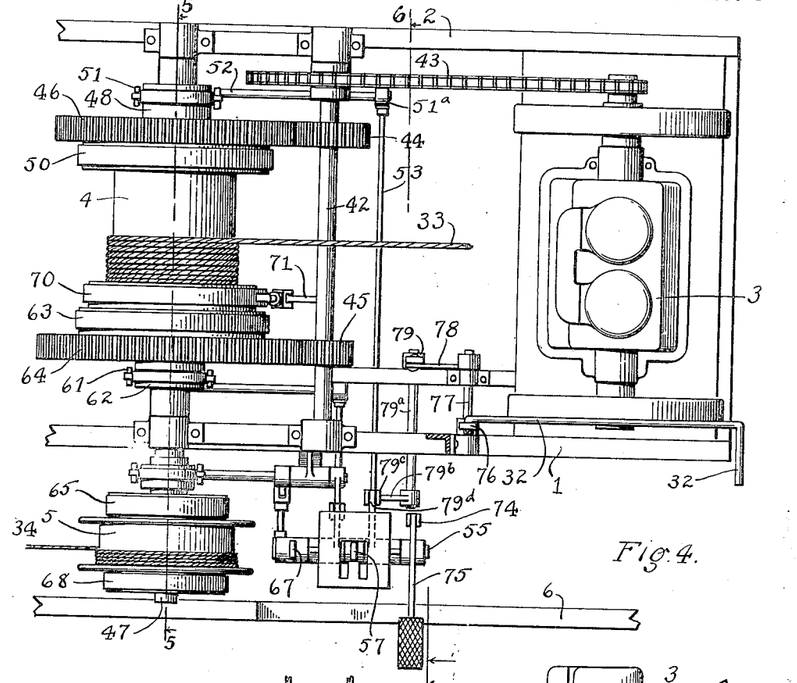

The clutch knock-out previously described as including the element 32 comprises the rod 32 shown in Figures —4— and —5— connected at its inner end with the upper end of a lever 76 the pivot between the ends of which constitute a rock shaft 77 and is connected at its lower end by means of the link 78 with the upper end of the lever 79 which is in turn mounted at its lower end on a rock shaft 79ᵃ provided at its other end with an arm 79ᵇ connected by means of a link 79ᶜ with the arm 79ᵈ of the lever 54. Thus when the rod 32 is moved outwardly by engagement of one of the booms therewith it will be seen that the lever 54 will be moved to release the clutch 50 controlled thereby.

It will be noted from the foregoing description that the power plant and control means comprises relatively few parts, all of which are relatively arranged to provide compactness and convenience of operation and control, and that every necessary and requisite feature of safety is provided to prevent injury either to the machinery or to the operator thereof. For example, the clutch control levers are moved inwardly toward the housing of the machine in releasing the clutches while the operator stands at the outer edge portion of his platform and draws said levers toward him for throwing either of the clutches in. Thus when the clutch knock-out is operated the lever will be moved away from the operator, and thus prevent injury to him.

An advantage of the machine also lies in that the great weight of the machine is disposed on the platform at a very low point so that all overbalancing as the loaded scoop and booms are raised, is absolutely prevented.

While I have shown the preferred embodiment of the invention in the accompanying drawings, it will be understood, of course, that such embodiment may be changed and varied in details of construction without departing from the invention as defined in the appended claims.

I claim as my invention:

1. In a machine of the kind specified, a scoop, a pair of winding drums, cables operatively associated with said scoop and said drums for effecting travel of said scoop in respectively opposite directions, a single actuating shaft common to both said drums, manually operable means associated with said drums and said actuating shaft whereby to effect forced rotation of one of said drums while permitting idle rotation of the other thereof, means for frictionally retarding free rotation of an idle drum for preventing slack in the cable while being unwound therefrom, manually controllable means operatively associated with said shaft and one of said drums for rotating the latter at different speeds for effecting slow travel of the scoop during its digging function and more rapid travel thereof when loaded, means associated with said last-named drum and said scoop for effecting elevation thereof to a discharge position and effecting sudden arrest of its travel to thereby effect projection of the contents of the scoop out of the same, means associated with said elevating means and said manually controllable means whereby to effect automatic dissociation of said last-named drum and said shaft as said scoop approaches its discharge position, and means associated with said elevating means for automatically effecting rebound of said scoop from its discharge position to a point permitting operation of said manually controllable means to effect repeated movement of said elevating means against said means for effecting rebound thereof to thereby effect discharge of residual contents of the scoop after primary discharging movement thereof.

2. In a machine of the kind specified, a scoop or shovel, cables connected with same for effecting travel thereof in opposite directions, means for guiding said cables, and drums upon which the same are respectively adapted to be wound, a single shaft common to both said drums and upon which they are rotatably mounted, a spur gear rigid with the shaft and disposed contiguous to one end of one of said drums, a power-actuated countershaft having a pinion meshing with said gear and equipped with a second pinion of different diameter than the first named, a spur gear rotatably mounted on the first-named shaft adjacent the other end of said drum and meshing with said last-named pinion, manually operable clutches for causing either of said gears to actuate said drum, and a single hand-lever common to both said clutches.

3. In a machine of the kind specified, a scoop or shovel, cables connected with same for effecting travel thereof in opposite directions, means for guiding said cables, and drums upon which the same are respectively adapted to be wound, a single shaft common to both said drums and upon which they are rotatably mounted, a spur gear rigid with the shaft and disposed contiguous to one end of one of said drums, a power-actuated countershaft having a pinion meshing with said gear and equipped with a second pinion of different diameter than the first named, a spur gear rotatably mounted on the first-named shaft adjacent the other end of said drum and meshing with said last-named pinion, manually operable clutches for causing either of said gears to actuate said drum, and a single hand-lever common to both said clutches, a clutch for engaging the other of said drums for actuation by said shaft, and brakes for both said drums for retarding the rotation of the inactive drum during actuation of the other to prevent slack in the cables.

4. In a machine of the kind specified, a scoop or shovel, cables connected with same for effecting travel thereof in opposite directions, means for guiding said cables, and drums upon which the same are respectively adapted to be wound, a single shaft common to both said drums and upon which they are rotatably mounted, a spur gear rigid with the shaft and disposed contiguous to one end of one of said drums, a power-actuated countershaft having a pinion meshing with said gear and equipped with a second pinion of different diameter than the first named, a spur gear rotatably mounted on the first-named shaft adjacent the other end of said drum and meshing with said last-named pinion, manually operable clutches for causing either of said gears to actuate said drum, a single hand-lever common to both said clutches, a scoop elevating device disposed for actuation by said cable as said scoop travels toward its discharge position, means disposed in the path of said elevating device for effecting arrest of movement and rebound thereof to thereby effect projection of the scoop contents, and means operatively associated with said elevating device and the active clutch operatively effecting travel of said scoop to discharge position for automatically releasing said clutch as said scoop attains a position contiguous to its discharge position to prevent breaking the cable and permit said rebound.

5. In a machine of the kind specified, a scoop or shovel, cables connected with same for effecting travel thereof in opposite directions, means for guiding said cables, and drums upon which the same are respectively adapted to be wound, a single shaft common to both said drums and upon which they are rotatably mounted, a spur gear rigid with the shaft and disposed contiguous to one end of one of said drums, a power-actuated countershaft having a pinion meshing with said gear and equipped with a second pinion of different diameter than the first named, a spur gear rotatably mounted on the first-named shaft adjacent the other end of said drum and meshing with said last-named pinion, manually operable clutches for causing either of said gear to actuate said drum, a single hand-lever common to both said clutches, a clutch for engaging the other of said drums for actuation by said shaft, brakes for both said drums for retarding the rotation of the inactive drum during actuation of the other to prevent slack in the cables, a scoop elevating device disposed for actuation by said cable as said scoop travels toward its discharge position, means disposed in the path of said elevating device for effecting arrest of movement and rebound thereof to thereby effect projection of the scoop contents, and means operatively associated with said elevating device and the active clutch operatively effecting travel of said scoop to discharge position for automatically releasing said clutch as said scoop attains a position contiguous to its discharge position to prevent breaking the cable and permit said rebound.

JOHN BRACKETT.